US007559053B2

(12) United States Patent
Krassovsky et al.

(10) Patent No.: US 7,559,053 B2
(45) Date of Patent: Jul. 7, 2009

(54) PROGRAM AND SYSTEM PERFORMANCE DATA CORRELATION

(75) Inventors: Viatcheslav Krassovsky, Redmond, WA (US); Dmitry Sonkin, Redmond, WA (US); Maciej Sarnowicz, Redmond, WA (US); Djana Ophelia Clay Milton, Lakewood, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/924,536

(22) Filed: Aug. 24, 2004

(65) Prior Publication Data

US 2006/0048101 A1    Mar. 2, 2006

(51) Int. Cl.
*G06F 9/44* (2006.01)
*G06F 11/00* (2006.01)

(52) U.S. Cl. .................. 717/126; 717/128; 717/130; 714/37; 714/30

(58) Field of Classification Search .................. 717/127
See application file for complete search history.

(56) References Cited

U.S. PATENT DOCUMENTS

| | | | | |
|---|---|---|---|---|
| 5,483,468 A * | 1/1996 | Chen et al. | ................... | 702/186 |
| 5,847,972 A * | 12/1998 | Eick et al. | ................... | 709/246 |
| 5,949,976 A * | 9/1999 | Chappelle | ................... | 709/224 |
| 6,332,212 B1 * | 12/2001 | Organ et al. | ................. | 717/128 |
| 6,601,192 B1 * | 7/2003 | Bowman-Amuah | .......... | 714/38 |
| 6,772,322 B1 * | 8/2004 | Merchant et al. | ............ | 712/227 |
| 6,772,411 B2 * | 8/2004 | Hayes et al. | ................. | 717/127 |
| 6,988,098 B2 * | 1/2006 | Sonkin et al. | ................... | 707/3 |
| 7,051,098 B2 * | 5/2006 | Masters et al. | .............. | 709/224 |
| 7,171,654 B2 * | 1/2007 | Werme et al. | ................ | 717/130 |
| 7,373,557 B1 * | 5/2008 | Wise et al. | ..................... | 714/47 |
| 2003/0018960 A1 * | 1/2003 | Hacking et al. | ............. | 717/158 |
| 2003/0140280 A1 * | 7/2003 | Kaler et al. | ................... | 714/37 |

OTHER PUBLICATIONS

Rahm, E. "Evaluation of Closely Coupled Systems for High Performance Database Processing", *IEEE Computer. Soc. Press.*, 1993, 301-310.

* cited by examiner

*Primary Examiner*—Tuan Q Dam
*Assistant Examiner*—Isaac T Tecklu
(74) *Attorney, Agent, or Firm*—Woodcock Washburn LLP

(57) ABSTRACT

System performance data and program performance data may be collected, converted into the same format and correlated by time. A graph or other display of system performance data over a time period may be displayed. A bar may be superimposed on the graph. A corresponding grid or other display, of program performance data over the same time period may be displayed. An item or line of the grid corresponding to a program event at a particular timepoint may be selected. A timepoint in the system performance graph may be selected by adjusting the position of the bar superimposed on the system performance graph. In response to the movement of the bar, the portion of the grid of program performance data displayed may be changed so that the grid of program performance data displays program performance data corresponding to the selected timepoint in the system performance graph.

24 Claims, 6 Drawing Sheets

PROGRAM AND SYSTEM PERFORMANCE DATA CORRELATION

FIELD OF THE INVENTION

This invention relates generally to computer performance evaluation and, more particularly, to correlating program and system performance data.

COPYRIGHT NOTICE/PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

BACKGROUND OF THE INVENTION

Computer performance evaluation involves measuring and analyzing the total effectiveness of a computer system, including throughput, individual response time, and availability of the system. Tools have been developed to monitor system resources while one or more programs execute. These tools typically collect system information and log the information to one or more performance logs. System information includes information concerning how much memory is being used, how much a computer is paging, how much CPU time a process is taking, and so on. Exemplary system performance monitoring tools include Microsoft's PerfMon and VERITAS i³™ for SQL Server.

Another type of performance evaluation tool monitors a single executing software application. For example, Microsoft's SQL Profiler captures SQL Server events from the server and saves them in a trace file. The trace file may be helpful in the troubleshooting of logic and program performance problems. Other well-known program performance evaluation tools include Oracle 9i trace.

Frequently, it would be useful to be able to correlate program performance data with system performance data to determine what effect application events and operations have on the computer system as a whole, in terms of CPU utilization, memory consumption and so on. The reverse is also true. It would often be helpful for a user to be able to understand how computer system resources at a given current rate of utilization affect the execution of a particular program.

SUMMARY OF THE INVENTION

Collected system performance data and program performance data may be received, converted into the same format and correlated by time. A graph or other display of system performance data over a time period may be displayed. A bar may be superimposed on the graph. A corresponding grid or other display of program performance data over the same time period may be displayed. An item or line of the grid corresponding to a program event at a particular point in time or timepoint may be selected. A timepoint is a measure of time and corresponds to a certain time interval (e.g., number of seconds) from the beginning of a correlation period. A correlation period in some embodiments of the invention is a period of time in which program and system performance data intersect in time.

A timepoint in the system performance graph may be selected by adjusting the position of the bar superimposed on the system performance graph. In response to the change in position of the bar, the portion of the grid of program performance data displayed may be changed so that the grid of program performance data displays program performance data corresponding to the selected timepoint in the system performance graph.

Similarly, a timepoint in the program performance grid may be selected by scrolling through the grid and selecting a particular item or line in the program performance grid. In response to the selection, the portion of the graph of system performance data displayed may be shifted so that the graph of system performance data displays system performance data corresponding to the selected timepoint in the program performance grid.

A zoom feature allows a selected range to be expanded (enlarged) or shrunk (diminished).

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Suppose that a system performance evaluation tool such as Microsoft's PerfMon collects pieces of information about a computer system over a predefined period of time. Suppose that during that period of time, a program evaluation tool such as a trace is also collecting information associated with a database program running on the computer system. Now suppose that at 2 pm on Monday, a generalized system slowdown is experienced. PerfMon may show that CPU utilization has shot up to 99% and memory usage has also climbed sharply. A system operator or database administrator (DBA) may suspect that the slowdown has something to do with the database program. In other words, a system or program administrator may want to know how the execution of a program is affecting the system environment. Without more information, however, determining just what is causing the system slowdown may be very difficult.

Similarly, suppose a DBA would like to know why a query submitted at 2 pm on Monday had a very long response time. The DBA might like to know what was happening system-wide at that point in time that may have affected the query response time. In other words, a system or program administrator may want to know how the system environment is affecting the performance of a program. In the absence of additional information, however, determining a system-wide cause of a program's poor performance (e.g., the query's poor response time) may be very difficult.

In accordance with some embodiments of the invention, system performance information and program performance information may be correlated and the correlated results presented or displayed in such a way that a timepoint selected in a display of system performance information results in the display of program performance information at that timepoint and vice versa.

Exemplary Computing Environment

Figure 1:
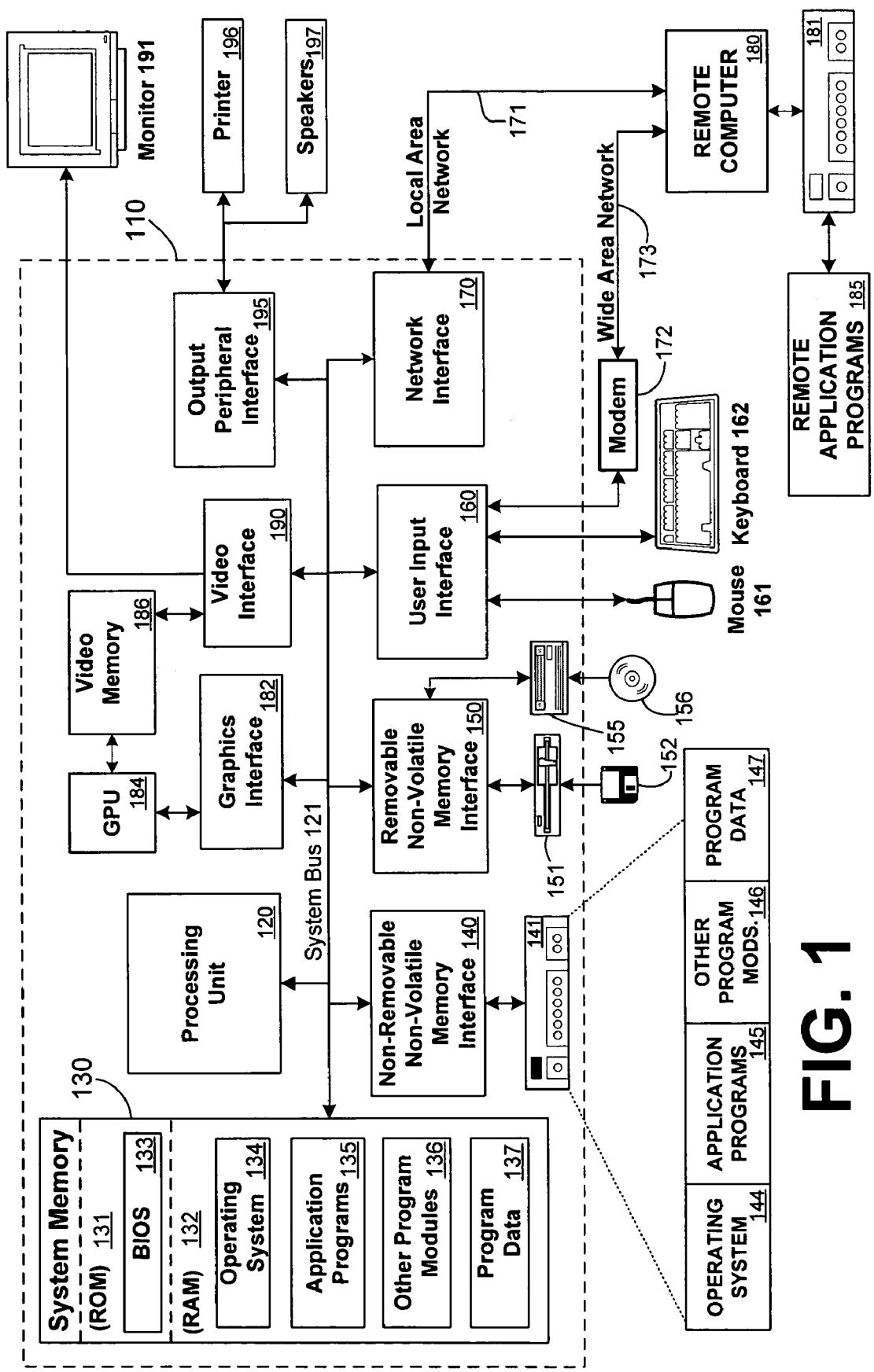
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Program Performance Data Correlation

Figure 2:
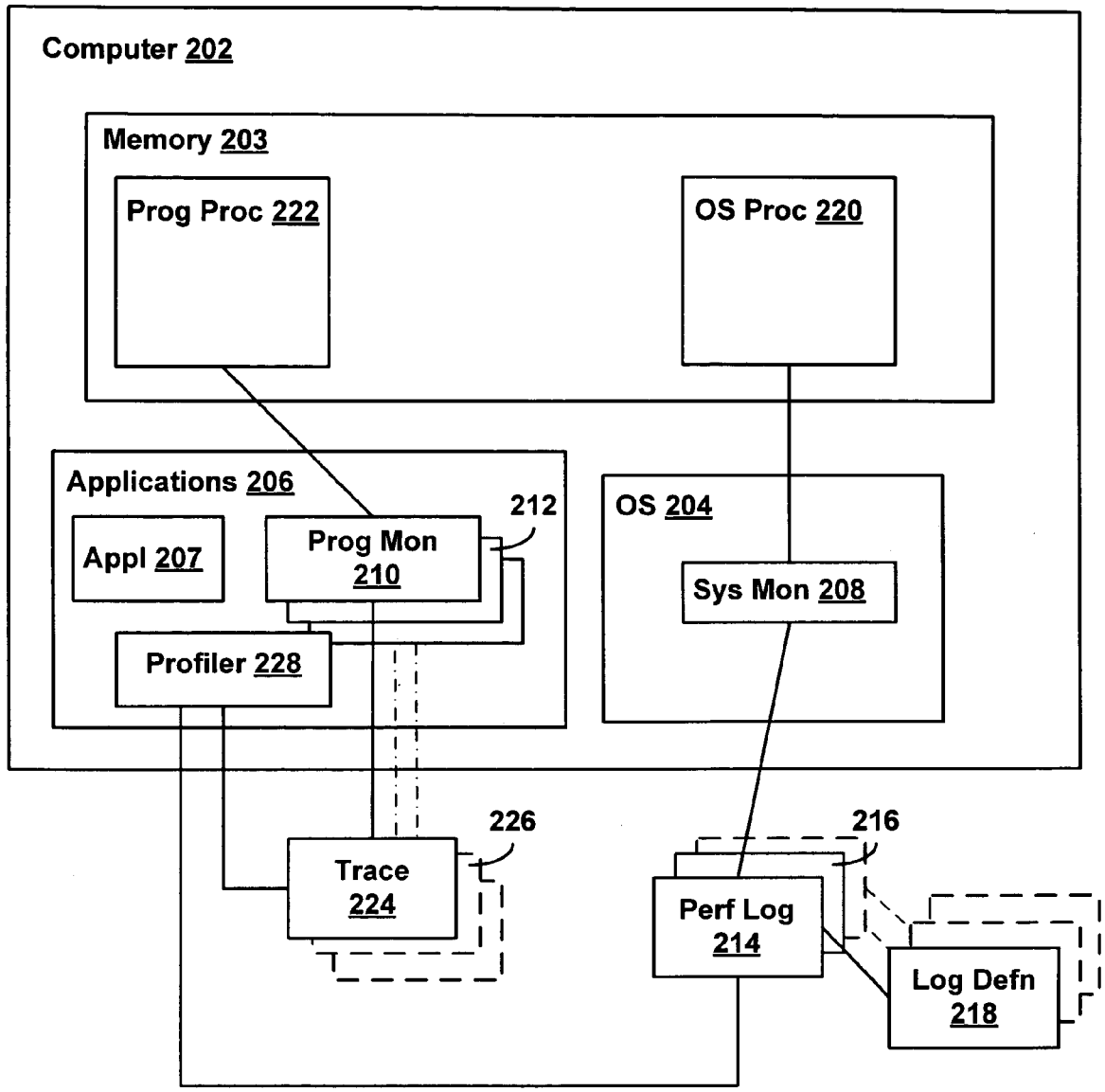
FIG. 2 is a block diagram of a system for correlating performance and trace data in accordance with one embodiment of the invention.

FIG. 2 is a block diagram of a system for correlating program and system performance data in accordance with one embodiment of the invention. In FIG. 2, computer 202 may represent a computer such as computer 110 described with respect to FIG. 1. On computer 202 may reside one or more of the following: an operating system (OS) 204 and applications programs 206. OS 204 may be an operating system such as operating system 144 described with respect to FIG. 1. OS 204 may include a system performance monitoring module 208 such as Microsoft's PerfMon, VERITAS i³™, or other system performance monitoring tool or module.

Applications programs 206 may include various application programs as represented by application 207, including database management programs such as SQL Server, word processing programs and many others. Applications programs 206 may also include one or more program monitoring modules 210, 212, etc. Alternatively, a program monitoring module such as program monitoring modules 210, 212, etc. may be included within the application it monitors (e.g., within application module 207). Alternatively, a program monitoring module such as program monitoring modules 210, 212, etc. may be included within OS 204.

System performance monitoring module 208 may monitor system environment conditions such as how much memory is being used, how much a computer is paging, percentage utilization of the CPU and so on, and may collect system performance information. System performance module 208 may monitor OS processes such as OS process 220, executing in memory 203. System performance monitoring module 208 may log the collected information to one or more performance logs such as performance logs 214, 216, etc. In some embodiments of the invention, this information is collected in the form of counters.

A counter may be a number representing the amount of memory used, a percentage of CPU time used by a process, the number of users connected or any other information deemed to be useful. Because the counters are collected in (specifiable) intervals, an event may be generated for each time interval.

Exemplary counters may include a memory counter such as "Pages/sec", the number of pages read from the disk or written to the disk to resolve memory references to pages that were not in memory at the time of the reference. Observation of this counter is useful to determine if a system needs more physical memory to prevent paging for virtual memory.

A memory counter such as "Committed Bytes" may display the size of virtual memory (in bytes) that must have backup by disk or physical RAM. Observation of this counter may be useful to determine how much physical RAM a system can use to prevent excessive paging.

A process object in the system monitoring module may be useful for monitoring applications. The process object may support a pseudo instance such as "_Total", representing the total of all the instances. So Process(_Total)\% Processor Time may represent the counter indicating the percentage of processor time taken by all the processes on the system. "Private Bytes", "Handle Count", "% Processor Time", and "Working Set" may be other useful process counters.

Handle is a generic term for an opaque identifier to a resource. Common handles include file handles, window handles, and memory handles. Handles are a limited resource in most systems. % Processor Time may refer to the amount of CPU time a process is using. The Working Set may represent the amount of virtual memory the OS is maintaining for a process. In some computer environments, freed memory for a process can stay in the process's working set. Many factors can influence the Working Set of a process, including memory requests of other processes, how the application was compiled and memory usage patterns.

A user object may represent a user of the computer system and thus can be used to determine who is using all the processor time, memory (Private Bytes), or causing all the page faults (with the Page Faults/sec counter).

Custom application counters can be created. It will be appreciated that the counters described herein are exemplary only and do not limit the scope of the invention contemplated. Applications including database applications such as but not limited to SQL Server, may add performance counters. Other server applications such as Microsoft Transaction Server (MTS), Internet Information Server (IIS) and many others may also add counters.

The system performance monitoring module 208 may be used to log data, send alert messages to an event log when a counter exceeds a preset bound, run a program when a counter goes over a specified limit and so on. The performance log(s) 214, 216, etc. may be associated with a log definition file. A log definition file such as log definition file 218, etc. may be generated dynamically for each performance log 214, 216, etc. when the performance log 214, 216, etc. is read by a reader or a profiler 228, as described more fully below with respect to the profiler. In the log definition file 218, etc., each specific counter may be converted into a column of numeric data type.

A program monitoring module 210, 212, etc. may be a trace provider or other program monitoring tool or utility which monitors a program process such as exemplary program process 222. A trace provider is a tool that captures events and saves them in a trace file (e.g., exemplary trace file 224, 226, etc.). The trace file 224, 226, etc. may be used to troubleshoot program logic and program performance problems. For example, SQL Trace Provider is a tool that captures SQL Server events from a SQL Server process and saves those events in a SQL trace file. The trace provider (program monitor, 210, 212, etc.) may be used to monitor areas of server activity, including:

Analyzing and debugging statements and stored procedures.
Monitoring slow performance.
Performing stress analysis.
Performing general debugging and troubleshooting.
Fine-tuning indexes.
Auditing and reviewing security activity.

In some embodiments of the invention, a trace provider (program monitor, 210, 212, etc.) is invoked by creating a new template or using an existing template that defines the data to be collected. The data is collected by "running a trace" on the events defined in the template. During the run, the trace provider may display the event classes and data columns that describe the event data being collected.

An event is an action generated by the application. Events may be grouped by event categories. In the case of the SQL Server engine, an event may be, for example, a login connection or the execution of a T-SQL statement and so on. All the data generated by an event may be displayed in the trace, which may include columns of data that describe the event. Columns in the trace may include the event class, the type of data collected and so on. A trace may be limited to a specific file or files by using a filter.

Each trace provider type (program monitor, 210, 212, etc.) may be associated with a corresponding trace definition file (not shown) that describes all the events and columns the trace is capable of producing. A trace event may correspond to a specific event instance found in a trace file and may include data needed for display. A trace event may include data and integer identifiers for each column in the event because the provider-specific trace definition may describe each possible column name and its data type referenced to an identifying integer.

Applications programs 206 may also include a profiler 228. Alternatively, profiler 228 may be included within OS 204. A profiler may include one or more readers (not shown), one or more log definition or trace definition files and one or more correlation tables. A profiler 228, according to some embodiments of the invention receives information collected from one or more program monitoring modules, 210, 212, etc. For example, a profiler 228 may receive one or more trace files 224, 226, etc. from one or more trace providers (program monitors 210, 212, etc.)

In addition to the one or more trace files, 224, 226, etc. the profiler 228 may also receive one or more files generated from the performance log(s) 214, 216, etc. created by the system monitoring module 208. A special log definition file 218, etc. may be generated dynamically for each performance log file upon reading the log file. In the log definition file 218, etc. each specific counter may be converted into a column (e.g., of numeric data type), the name of the column corresponding to the name of the counter. In some embodiments a reader generates the log definition file 218, etc. or the trace definition file(s). In some embodiments of the invention, the data structure created to hold the system performance data and the program performance data has a common format, structure or layout.

Figure 3:
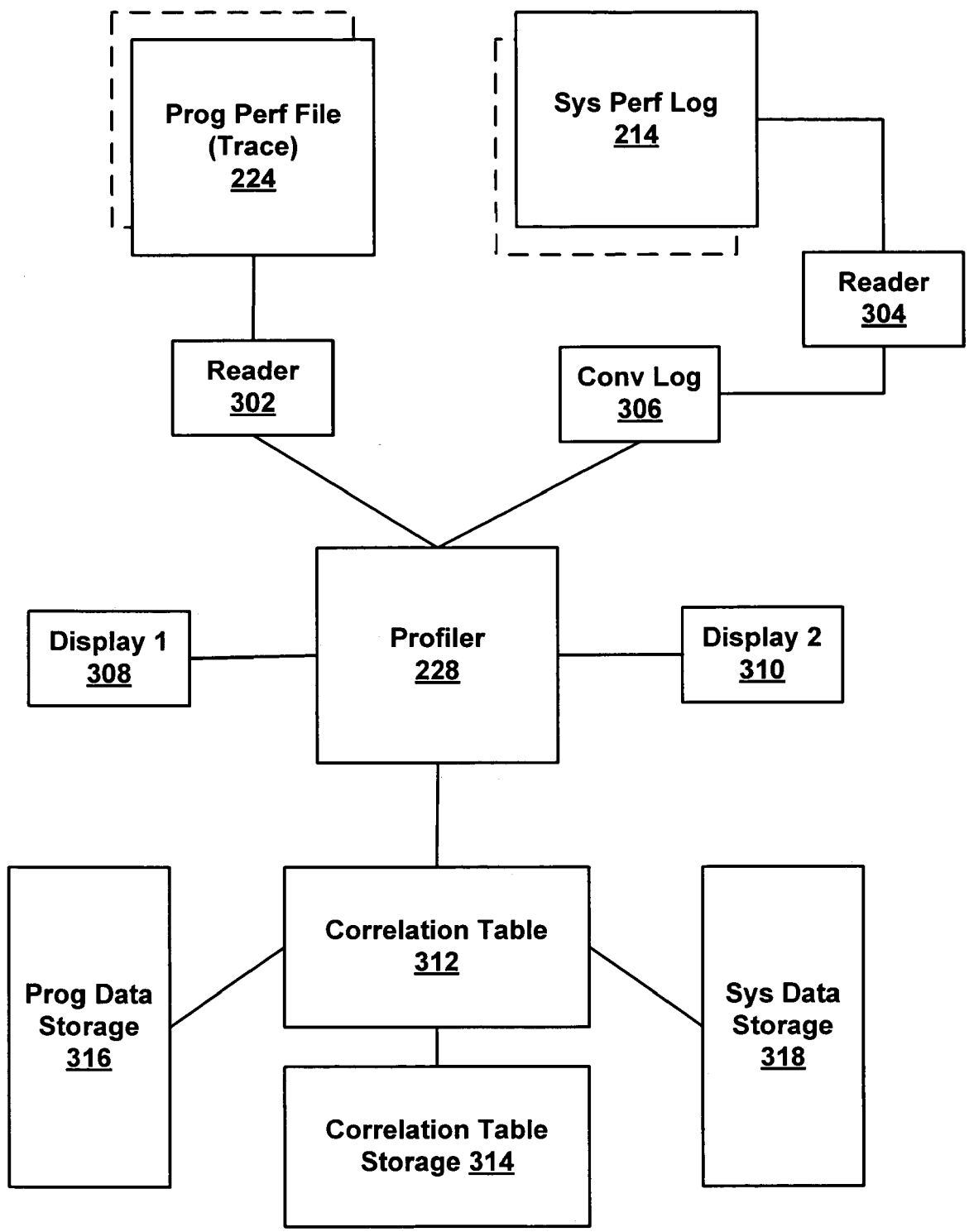
FIG. 3 is a more detailed block diagram of a portion of the system of FIG. 2.

FIG. 3 is a more detailed block diagram of portions of FIG. 2. In some embodiments of the invention, an instance of a performance counter snapshot (part of a performance log 214, 216, etc.) may be converted into the same structure as that of a trace event or trace file 224, 226. The converted performance log is represented in FIG. 3 by converted log 306. In some embodiments a reader 304 populates a log definition file 218, etc. and/or generates converted log 306. Converted log 306 may include events that include columns of values of counters and a column containing a timestamp. In addition, the log definition file may include a timepoint value.

Similarly, program performance data 224 (e.g., a trace file) may be read by a reader 302. In some embodiments the reader 302 populates a trace definition file and may pass the trace file and/or trace definition file to the profiler 228. The profiler 228 may correlate the data from the program performance file 224 and the converted system performance log information 306 by event timestamp into a correlation table 312.

Hence, multiple data sources may be correlated via the correlation table 312, which in some embodiments is implemented as an object. The correlation table 312 may contain the following information for each record:
- A time reference point, for example, the relative time lapsing from the beginning of the correlation interval
- A data storage identifier, that is, an identification of the source of the event data and
- A row number of the event in data storage.

In some embodiments, the correlation table is an array of integers, in which the value of each integer is a timepoint and the index is a number (e.g., row number) in the correlation table storage. In some embodiments of the invention, the correlation table 312 is populated dynamically as the data sources chosen for correlation are read. In some embodiments multiple trace files from multiple trace data providers and multiple system performance logs may be correlated. In some embodiments of the invention, to be able to efficiently correlate data in any direction, a correlation table is placed in a correlation table storage 314 which enables the data to be accessed in a direction other than a forward, read-only manner. In some embodiments, the correlation table storage 314 contains events used for correlation, each event including a column for timepoint, data storage identifier (e.g., identifying the data source: for example, data source=1 may indicate the data is system performance data, while data source=2 may indicate that the data is program performance data).

The populated correlation table 312 may be used for lookups. In some embodiments of the invention, a CorrelationStorage class performs the process of finding a corresponding event to the event supplied. In some embodiments the CorrelationStorage class is defined as follows:

```
class CorrelationStorage
{
HRESULTRegisterCorrectionNotify(int DataStorageID,
ICorrelationNotify* p);
HRESULT Correlate(int DataStorageID, DWORD
dwTimePoint);
};
where CorrelationNotify Interface is defined as:
interface ICorrelationNotify
{
        HRESULT OnCorrelationChange(long
        lStorageSpecificRowID, DWORD
dwTimePoint);
    };
```

In some embodiments of the invention, the correlation interface (ICorrelationNotify interface) is implemented on the client and registered with CorrelationStorage. Calling the Correlate( ) method initiates a look-up in the correlation table 312. In other words, when a bar superimposed on a display is dragged or repositioned (or alternatively, as a selected item in a scrollable display is changed), the corresponding component may call ICorrectionStorage::Correlate( ). The CorrelationStorage object (represented by Correlation Table Storage 314) may find the actual (or closest matching) event by performing a binary search to locate the event in the correlation table storage 314 and then perform a linear search in both directions to find the nearest correlated event to the selected timepoint (from the counterpart DataStorageId). After the appropriate table entry is found, the data at the row number indicated in the table entry for the specified data source storage (e.g., program performance data storage 316 or system performance data storage 318) is accessed to retrieve the information to be displayed. A callback may be initiated (e.g., ICorrelationNotify::OnCorrelationChange( ) is called) to notify the counterpart component to perform a user interface operation associated with the correlation. The user interface may display the event corresponding to the selected timepoint (display 1 308, display 2 310) as described more fully below.

A timepoint, as described above, is a measure of time and corresponds to a certain time interval (e.g., a number of seconds) from the beginning of the correlation period. A correlation period in some embodiments of the invention is a period of time in which program and system performance data intersect in time. In some embodiments of the invention, if one monitoring module collects data from time t and a second monitoring module collects data from time t+x, the data collected from time t to time t+x is ignored because no data from the second monitoring module can be correlated with the timepoints between time t and time t+x.

Figure 5:
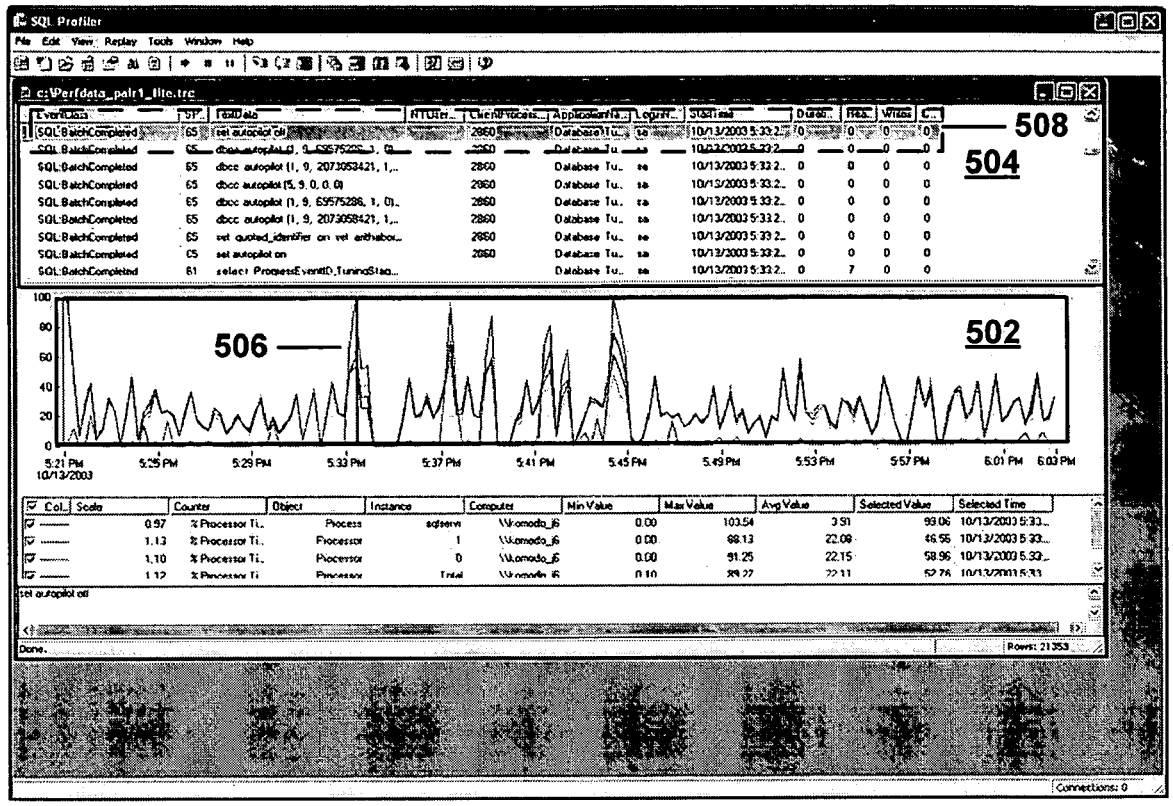
FIG. 5 is an exemplary screen shot of a display of system performance data and program performance data in accordance with one embodiment of the invention.

In some embodiments of the invention, the system performance information and program performance information are displayed as illustrated by FIG. 5. In FIG. 5 display 502 represents exemplary system performance information. Display 504 represents exemplary program performance information. It will be appreciated that the user interface as illustrated by FIG. 5 is exemplary only. The type of information displayed may be a graph, a grid, a chart, summary data, time data, event details, a call tree, a block diagram, an animated model or any suitable display and may display information concerning resources, files, programs, processes, events and so on.

In some embodiments of the invention, the graph control may display a vertical line in a highly visible color (e.g., red) that indicates current selection position in the display. The vertical line may be moved (e.g., with a mouse). Moving the vertical line or bar may cause a notification to the system and program performance windows to change the selection in those windows so that events that occurred at a time when system performance counters were captured may be easily observed.

For example, in FIG. 5, bar 506 may be adjusted or repositioned. When a bar 506 is moved, the displays 502 and 504 may shift, scroll or reposition in correspondence with the movement of the bar 506. For example, if bar 506 is moved to timepoint 6:01 pm, the portion of the system performance data displayed in display 502 may shift to the left so that the portion of the graph corresponding to the 6:01 pm timepoint will be located in a more central position of the graph than is now depicted in FIG. 5. The display 504 may also scroll up or down so that the event(s) corresponding to the timepoint 6:01 pm are visible in the display 504 or are located in a more central position of the grid. The item or line that most closely matches the selected timepoint in the system performance display may be selected or highlighted.

Similarly, if the selected item or line 508 (represented in display 504 as a highlighted line of the grid) is moved to the item or line associated with timepoint 6:01 pm, the portion of the program performance data displayed in display 504 may scroll up or down so that the portion of the grid corresponding to the 6:01 pm timepoint will be located in a more central position of the grid. The display 502 may also shift correspondingly to the left or right so that the portion of the system performance graph corresponding to the timepoint 6:01 pm will be located in a more central position of the graph than is now depicted in FIG. 5 and the vertical line or bar in the display may move to the selected timepoint.

Figure 6:
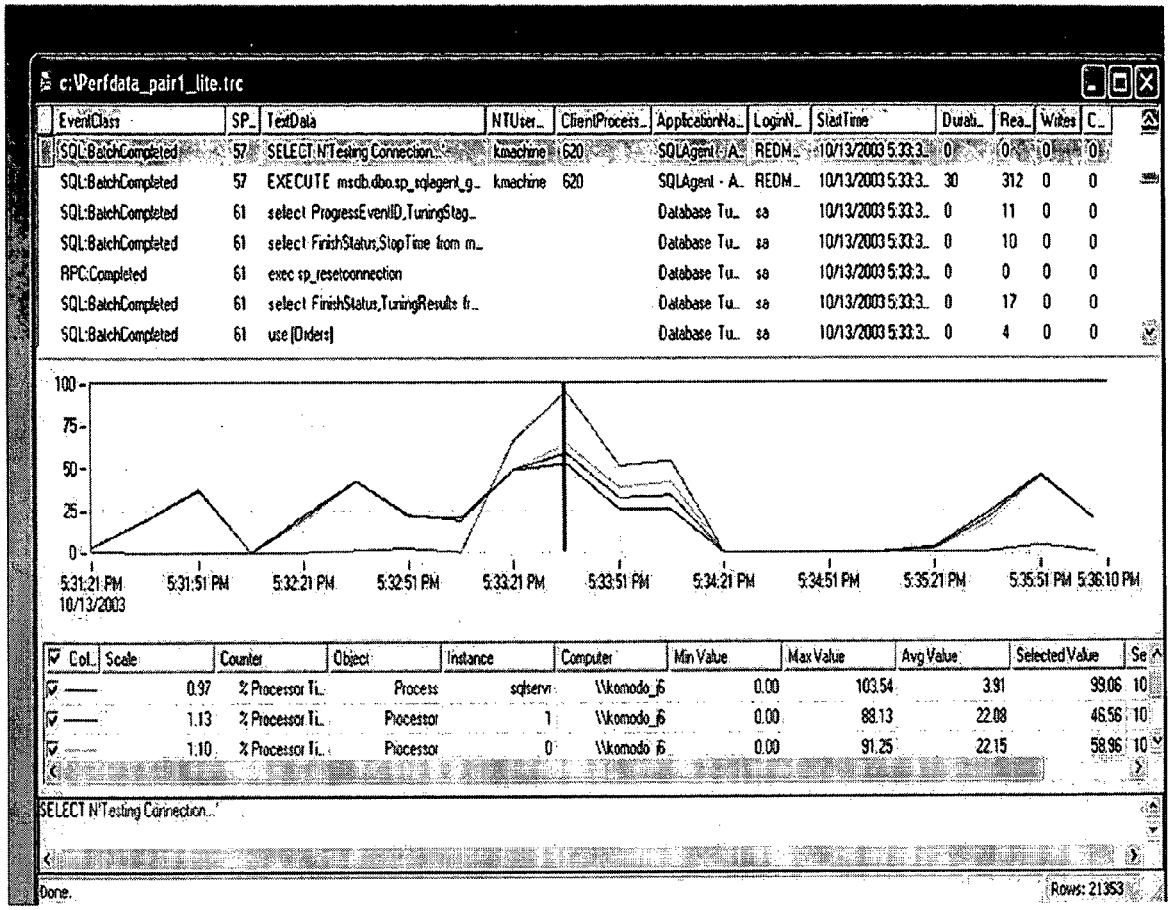
FIG. 6 is an exemplary screen shot of a display of system performance data and program performance data in which a zoom feature has been activated in accordance with one embodiment of the invention.

A zoom-in and zoom-out functionality may also be invoked by for example, clicking a left mouse button in the system performance window and then holding and dragging the mouse. A rubber-band selection rectangle may be generated which changes in size until the mouse button is released. Alternatively, a zoom in and zoom out feature may be invoked via a menu selection. FIG. 6 illustrates a graph for which a zoom in selection has been selected.

Figure 4:
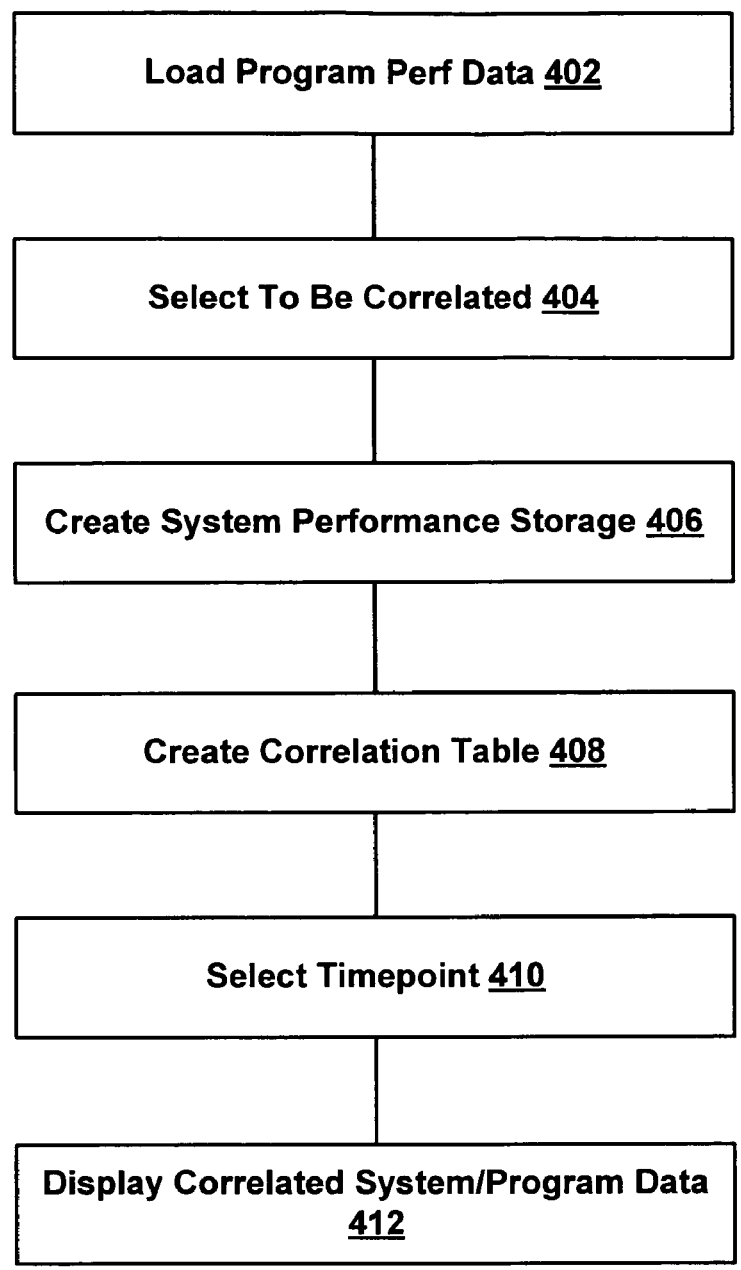
FIG. 4 is a flow diagram of an exemplary method for correlating system performance data and program performance data in accordance with one embodiment of the invention.

FIG. 4 is an exemplary flow diagram of a method for correlating system and program performance data in accordance with some embodiments of the invention. In FIG. 4, at step 402 program performance data is loaded into a data storage. At step 404 the program performance data loaded into the data storage is selected to be correlated with system performance data. At step 406 data storage for the system performance data is created and is populated with events produced by the system performance data reader. At step 408 a correlation table and correlation table storage are constructed.

At step 410 a timepoint is selected (either by positioning the vertical line or bar or by selecting an item or line in a grid). At step 412 the correlation table may be consulted to find the row number and the data source identifier of the alternate source data that most closely matches the new timepoint. In some embodiments of the invention a CorrelationStorage object may find the actual (or closest matching) event by performing a binary search to locate the corresponding event in the other data source. A linear search may be performed in both directions to find the nearest correlated event to the selected timepoint (from the counterpart DataStorageId). At step 414 when the closest match is found, the corresponding information may be displayed. In some embodiments, a callback is initiated (e.g., ICorrelationNorify::OnCorrelationChange( ) is called) to notify the counterpart component to perform a user interface operation associated with the correlation and the corresponding event is displayed.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for correlating system performance data and program performance data, the system comprising:
 a memory having stored therein computer executable instructions;
 a computer processor for executing the computer executable instructions;
 a system performance monitoring module configured to collect system performance data;
 a program monitoring module configured to monitor operation of a program and to collect program performance data relating to events occurring in connection with the program;
 a profiler that receives the system performance data from the system performance monitoring module and that receives the program performance data from the program monitoring module, converts the system performance data and the program performance data into a common format and generates from the converted system performance data and the converted program performance data a correlation table;
 the correlation table comprising a plurality of data elements, wherein each data element of the plurality of data elements comprises a point in time, a data storage identifier indicating a data source, the data source comprising a system performance data source or a program performance data source, and a row number identifying a storage location of an event instance occurring in the data source, wherein the correlation table is stored in a correlation table storage that enables the plurality of data elements to be accessed in a direction other than a forward, read-only direction; and
 a user interface for displaying information associated with the plurality of data elements of the correlation table in a graph, wherein a user selected point in time is displayed as a vertical line superimposed on the graph, and wherein a binary search is performed to determine a row number and a data storage identifier of an event in one of the data sources corresponding to the user selected point in time and a linear search is performed to determine a correlated event in a different one of the data sources that is nearest to the user selected point in time.

2. The system of claim 1, wherein in response to receiving a user selection of a second point in time associated with the system performance data, the user interface displays one of the plurality of data elements in a highlighted display, the displayed data element associated with the second point in time and the program performance data source.

3. The system of claim 1, wherein in response to receiving a second point in time associated with the program performance data, the user interface displays a vertical line superimposed over a one of the plurality of data elements associated with the second point in time and the system performance data source.

4. The system of claim 1, wherein the program performance data is displayed as a grid, the grid comprising a plurality of items, each of the plurality of items comprising the point in time and an event occurring at the point in time.

5. The system of claim 1, wherein a second point in time is selected by moving the vertical line superimposed on the graph.

6. The system of claim 4, wherein a second point in time is selected by selecting one of the plurality of items.

7. The system of claim 1, further comprising a system performance data definition file, the system performance data definition file describing a column of data representing a system counter over a time interval.

8. The system of claim 1, further comprising a program performance data definition file, the program performance data definition file describing a plurality of types of information collected by a program monitoring module.

9. The system of claim 1, wherein the profiler comprises a reader for reading system performance data.

10. The system of claim 1, wherein the profiler comprises a reader for reading program performance data.

11. The system of claim 8, wherein the program monitoring module is a trace program.

12. A method for correlating system performance data collected by a system performance monitoring module and program performance data collected by a program monitoring module, the method comprising:
receiving the program performance data from the program monitoring module and the system performance data from the system performance monitoring module, the program performance data relating to events occurring in connection with the program;
converting the program performance data and the system performance data into a common format;
generating a correlation table that correlates the program performance data and the system performance data by time, the correlation table comprising a plurality of data elements, each data element of the plurality of data elements comprising a time reference point, a data storage identifier indicating a data source, the data source comprising a system performance data source or a program performance data source, and a row number identifying a storage location of an event instance occurring in the data source;
receiving a user selection of a first point in time;
performing a binary search to determine a row number and a data storage identifier of a correlation table entry for the system performance data corresponding to the first point in time;
performing a linear search to determine a correlated event in the system performance data that is nearest to the first point in time; and
displaying the correlated program performance data for the first point in time in a highlighted item and the correlated system performance data for the first point in time identified by a vertical bar superimposed over the correlated system performance data at the first point in time.

13. The method of claim 12, wherein in response to receiving a second point in time, the correlated program performance data for the second point in time is highlighted.

14. The method of claim 12, wherein in response to receiving a second point in time, the correlated system performance data for the second point in time is displayed, identified by a vertical bar superimposed over the correlated system performance data at the second point in time.

15. The method of claim 12, further comprising locating the correlated system performance data for the first point in time by accessing the correlation table.

16. The method of claim 12, further comprising locating the correlated program performance data for the first point in time by accessing a correlation table.

17. The method of claim 12, wherein the correlation table comprises a point in time, a performance data source identifier and a row number in a performance data source.

18. The method of claim 17, wherein the data source identifier is associated with the system performance data.

19. The method of claim 17, wherein the data source identifier is associated with the program performance data.

20. A computer-readable storage medium comprising computer-executable instructions for:
receiving program performance data collected by a program monitoring module and relating to events occurring in connection with a program and system performance data collected by a system performance monitoring module;
converting the program performance data and the system performance data into a common format;
generating a correlation table that correlates the program performance data and the system performance data by time, the correlation table comprising a plurality of data elements, each data element of the plurality of data elements comprising a time reference point, a data storage identifier indicating a data source, the data source comprising a system performance data source or a program performance data source, and a row number identifying a storage location of an event instance occurring in the data source;
receiving a user selection of a first point in time;
performing a binary search to determine a row number and a data storage identifier of a correlation table entry for the system performance data corresponding to the first point in time;
performing a linear search to determine a correlated event in the system performance data that is nearest to the first point in time; and
displaying the correlated program performance data for the first point in time in a highlighted item and the correlated system performance data for the first point in time identified by a vertical bar superimposed over the correlated system performance data at the first point in time.

21. The computer-readable storage medium of claim 20, comprising further computer-executable instructions for:
in response to receiving a second point in time, highlighting the correlated program performance data for the second point in time.

22. The computer-readable storage medium of claim 20, comprising further computer-executable instructions for:
in response to receiving a second point in time, identifying the correlated system performance data for the second point in time by superimposing a vertical bar over the correlated system performance data at the second point in time.

23. The computer-readable storage medium of claim 20, comprising further computer-executable instructions for:
locating the correlated system performance data for the first point in time by accessing the correlation table.

24. The computer-readable storage medium of claim 20, comprising further computer-executable instructions for:
locating the correlated program performance data for the first point in time by accessing a correlation table.

* * * * *